(12) United States Patent
Nogle

(10) Patent No.: US 8,858,393 B2
(45) Date of Patent: Oct. 14, 2014

(54) APPARATUS AND METHOD FOR RAPID WARM-UP OF A COMBUSTION ENGINE

(71) Applicant: Chrysler Group LLC, Auburn Hills, MI (US)

(72) Inventor: Thomas D. Nogle, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 151 days.

(21) Appl. No.: 13/624,991

(22) Filed: Sep. 24, 2012

(65) Prior Publication Data
US 2013/0079195 A1 Mar. 28, 2013

Related U.S. Application Data

(60) Provisional application No. 61/538,227, filed on Sep. 23, 2011.

(51) Int. Cl.
F16H 59/00 (2006.01)
B60W 10/04 (2006.01)
B60W 10/10 (2012.01)
F16H 61/00 (2006.01)
B60W 10/115 (2012.01)
B60W 30/194 (2012.01)
F16H 59/64 (2006.01)
F16H 61/02 (2006.01)

(52) U.S. Cl.
CPC ...... *B60W 10/115* (2013.01); *F16H 2061/0232* (2013.01); *F16H 61/0059* (2013.01); *B60W 30/194* (2013.01); *F16H 59/64* (2013.01)
USPC ............................. 477/98; 477/110; 477/111

(58) Field of Classification Search
USPC .................... 477/98, 107, 110, 111
See application file for complete search history.

(56) References Cited

U.S. PATENT DOCUMENTS

| 4,344,398 | A | 8/1982 | Ikeura |
| 6,573,614 | B2 | 6/2003 | Doll |
| 7,226,388 | B2 * | 6/2007 | Berger .......................... 477/115 |
| 8,622,859 | B2 * | 1/2014 | Babbitt et al. .................... 475/1 |
| 2004/0109774 | A1 | 6/2004 | Leising et al. |
| 2007/0004555 | A1 | 1/2007 | Berger |

FOREIGN PATENT DOCUMENTS

| JP | 2006 300282 A | 11/2006 |
| JP | 2008 158699 A | 7/2008 |
| WO | WO 2010144753 A1 * | 12/2010 |
| WO | WO 2011/085926 | 7/2011 |

* cited by examiner

Primary Examiner — Tisha Lewis
(74) Attorney, Agent, or Firm — Ralph E Smith

(57) ABSTRACT

A transmission and a method for loading an engine in a vehicle. The transmission includes a gear set, an input shaft coupled to the gear set, and a plurality of friction elements coupled to the gear set. The transmission also includes a control system to direct a subset of the plurality of friction elements to engage the gear set to stall the input shaft thereby placing a load on the engine. The load causes additional heat that may be used to warm up the vehicle's passenger compartment and/or defrost the vehicle's windshield.

16 Claims, 5 Drawing Sheets

APPARATUS AND METHOD FOR RAPID WARM-UP OF A COMBUSTION ENGINE

CROSS-REFERENCE TO RELATED APPLICATION

This application claims the benefit of U.S. Provisional Ser. No. 61/538,227, filed Sep. 23, 2011.

FIELD

The present disclosure relates to an apparatus and a method for rapidly warming up an engine in a vehicle and, more particularly to, an apparatus and a method of warming up an engine in a vehicle by loading the engine using a transmission.

BACKGROUND

Some vehicles depend on their engines to heat their passenger compartments and defrost their windshields. During cold weather, when the vehicle has not been operated for an extended period of time and is cold, the engine is not able to heat the vehicle's passenger compartment or defrost the vehicle's windshield until the engine warms up. This may cause an unwanted delay before the driver can operate the vehicle if the windshield needs defrosting. In addition, the cold interior of the vehicle may cause discomfort for the driver and other passengers. Thus, there is a need to decrease the time needed to warm up a vehicle from a cold start.

SUMMARY

The present disclosure provides a transmission for loading an engine in a vehicle. The transmission includes a gear set, an input shaft coupled to the gear set, and a plurality of friction elements coupled to the gear set. The transmission also includes a control system that directs a subset of the plurality of friction elements to engage the gear set to stall the input shaft.

The transmission may also include an output shaft coupled to the gear set such that no torque is transferred to the output shaft when the input shaft is stalled. Further, the plurality of friction elements may include six friction elements and the subset of the plurality of friction elements may include any three of the plurality of friction elements. Two of the three friction elements used to stall the input shaft may be used to engage the gear set to implement second gear.

The control system may disengage one friction element of the subset of the plurality of friction elements to implement second gear immediately after stalling the input shaft. The control system may also cause the subset of friction elements to stall the input shaft when the transmission is in park. Additionally, the input shaft may be coupled to the engine and stalling the input shaft may place a load on the engine. Furthermore, the control system may direct the subset of friction elements to engage the gear set when a temperature of the engine is below a threshold. The control system may also direct the subset of friction elements to disengage the gear set when a temperature of the engine is above a threshold.

A method of loading an engine in a vehicle includes providing a transmission that includes a gear set, an input shaft coupled to the gear set, and a plurality of friction elements coupled to the gear set. The method also includes engaging the gear set with a subset of the plurality of friction elements to stall the input shaft.

The transmission may further include an output shaft coupled to the gear set so that the step of engaging the gear set to stall the input shaft does not transfer torque to the output shaft. Further, the plurality of friction elements may also include six friction elements and the subset of the plurality of friction elements may include any three of the plurality of friction elements. Also, two of the three friction elements may engage the gear set to implement second gear.

The method may also include disengaging the gear set with one of the three friction elements to implement second gear after stalling the input shaft. Furthermore, the method may include disengaging the gear set with one of the three friction elements to implement third gear after stalling the input shaft. Further, engaging the gear set may occur when the transmission is in park.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

DETAILED DESCRIPTION

Figure 1:
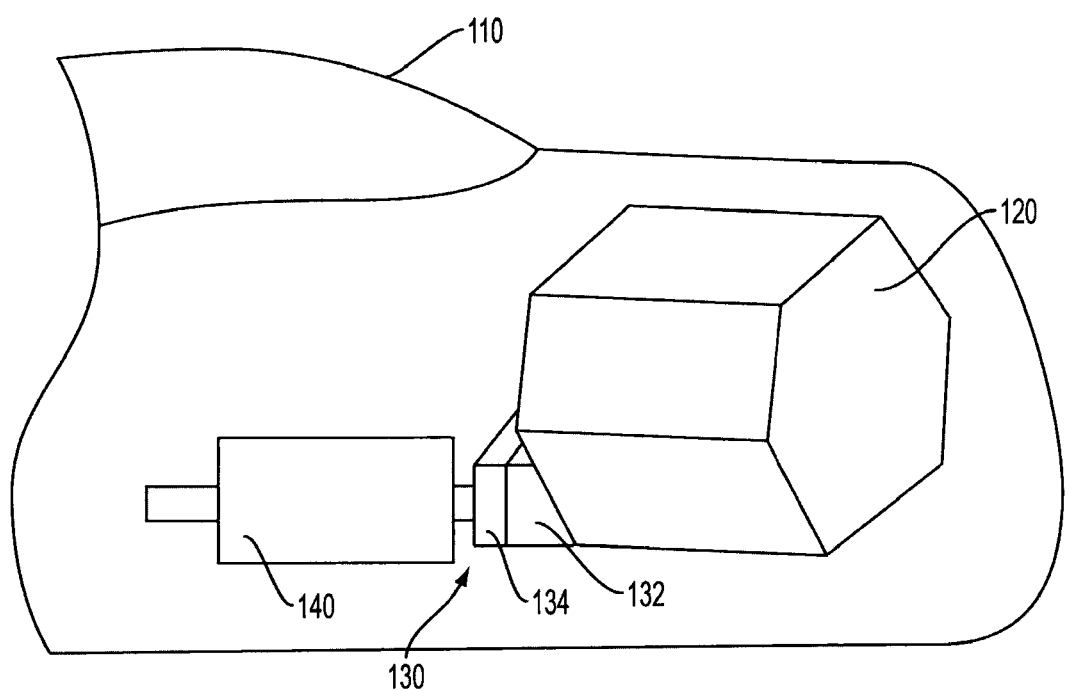
FIG. 1 illustrates a vehicle with an exemplary transmission coupled to an engine.

FIG. 1 illustrates a vehicle 110 that comprises an engine 120, a torque converter 130 that comprises a housing 132 and a turbine 134, and an automatic transmission 140 that is able to load the engine 120 by way of the torque converter 130. The engine 120 is mechanically coupled to the housing 132 of the torque converter 130. The automatic transmission 140 is mechanically coupled to the turbine 134 of the torque converter 130. The torque converter 130 uses fluid coupling to couple the turbine 134 and the housing 132. The torque converter 130 operates to transfer torque between the engine 120 and the automatic transmission 140.

The automatic transmission 140 operates in various operational modes. The modes of the automatic transmission 140 may include park, neutral, drive, and drive low. It should be appreciated that other modes may be available as well. When the automatic transmission 140 is in an operational mode other than park or neutral, the automatic transmission 140 implements various gearing ratios that transfer torque from the engine 120 to the vehicle's 110 wheels (not shown). For example, when in drive, the automatic transmission 140 may implement a first gear, second gear, third gear, or fourth gear. It should be appreciated that other gears may be available for the drive operational mode. Moreover, not every gear may be available for every operational mode. It should be understood that the automatic transmission 140 may have many modes and gears operable within each mode.

Figure 2:
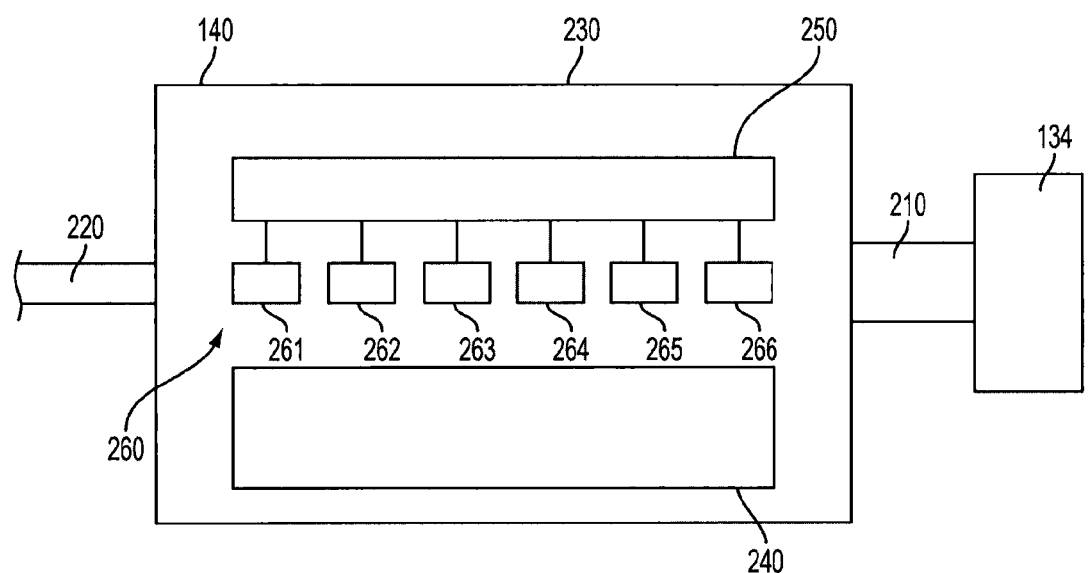
FIG. 2 illustrates various parts of the exemplary transmission of FIG. 1 in accordance with a disclosed embodiment.

FIG. 2 is a block diagram that illustrates further details of the automatic transmission 140 in accordance with a disclosed embodiment. The automatic transmission 140 comprises a body 230 that houses a gear set 240, a controller system 250 and a plurality of friction elements 260. The friction elements 260 comprises a first friction element 261, a second friction element 262, a third friction element 263, a fourth friction element 264, a fifth friction element 265, and a sixth friction element 266. The controller system 250 is coupled to each friction element of the plurality of friction elements 260. The friction elements 260 may be clutches. In a preferred embodiment, the gear set 240 may include one or more planetary gear configurations or other configurations of gears. The controller system 250 may include a valve body, solenoids, or other systems or devices needed to operate the friction elements 260 to implement the gearing described below. It should be understood that various friction elements, gear sets, and controller systems may be used in the automatic transmission 140.

The automatic transmission 140 also includes an input shaft 210 and an output shaft 220. The input shaft 210 is mechanically coupled to the turbine 134 of the torque converter 130. The output shaft 220 is coupled to the wheels (not shown) of the vehicle 110 and transfers torque from the automatic transmission 140 to the wheels.

Generally, the friction elements 260 are positioned in the body 230 next to the gear set 240 and move into and out of engagement with the gear set 240. The movement of the friction elements 260 is controlled by the controller system 250. The automatic transmission 140 uses the friction elements 260 and the gear set 240 to implement different gearing ratios and move between the gearing ratios while the vehicle 110 is moving. For example, the first and second friction elements 261, 262 may be engaged to implement first gear in the automatic transmission 140. Further, the second and third friction elements 262, 263 may be engaged to implement second gear in the automatic transmission 140.

In an exemplary embodiment, the first friction element 261 may be an underdrive clutch, the second friction element 262 may be an overdrive clutch, the third friction element 263 may be a reverse clutch, the fourth friction element 264 may be a 4th clutch, the fifth friction element 265 may be a 2nd clutch, and the sixth friction element 266 may be a low-reverse clutch. The clutches or friction elements 260 may be selectively engaged with the gear set 240 to implement five different gears. The clutches that may be engaged to implement each individual gear and the clutch applied when the transmission is in park or neutral are shown below in Table 1.

TABLE 1

| Gear | Clutches Applied |
| --- | --- |
| Reverse | Reverse Clutch and Low-Reserve Clutch |
| Park | Low-Reverse Clutch |
| Neutral | Low-Reverse Clutch |
| First Gear | Underdrive Clutch and Low-Reverse Clutch |
| Second Gear | Underdrive Clutch and 2nd Clutch |
| Third Gear | Underdrive Clutch and Overdrive Clutch |
| Fourth Gear | Overdrive Clutch and 4th Clutch |

Figure 3:
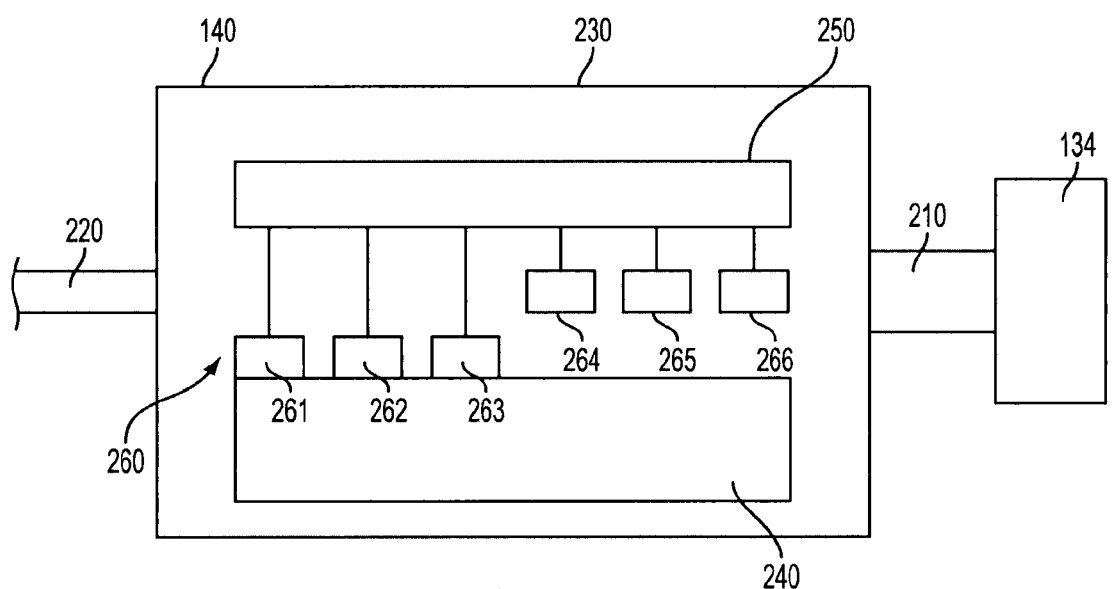
FIG. 3 illustrates the exemplary transmission of FIG. 2 with select friction elements engaged in accordance with a disclosed embodiment.

The automatic transmission 140 also uses the friction elements 260 to stall the input shaft 210 when the automatic transmission 140 is in park. The input shaft 210 is "stalled" when it is prevented from rotating. To stall the input shaft 210, the automatic transmission 140 causes three or more of friction elements 260 to engage the gear set 240. In addition to stalling the input shaft 210, when three or more of the friction elements 260 are engaged, torque generated by the engine 120 is not transferred to the output shaft 220. Any combination of three or more of the friction elements 260 may be engaged to stall the input shaft 210. For example, in one embodiment illustrated in FIG. 3, the first, second, and third friction elements 261, 262, 263 may engage with gear set 240 to stall the input shaft 210. Alternatively, the second, fourth, and sixth friction elements 262, 264, 266 may be engaged to stall the input shaft 210. Furthermore, the automatic transmission 140 may engage all of the friction elements 260 to stall the input shaft 210.

When the input shaft 210 is stalled, it stalls the turbine 134 of the torque converter 130 and causes the torque converter 130 to place a load on the engine 120. With the engine 120 loaded, the engine's 120 throttle may be opened significantly without racing the engine 120. As a result, additional heat is generated by the engine 120 that would not have been generated if the engine 120 were not loaded. Furthermore, heat is generated by the torque converter 130 when the turbine 134 is stalled and the engine 120 is operating. The additional heat generated by the engine 120 and the torque converter 130 may be used to heat the vehicle's 110 passenger compartment and defrost the vehicle's 110 windshield. Thus, the disclosed embodiment solves several needs that are not addressed by current automotive technology.

Stalling the input shaft 210 to place a load on the engine 120 may offer other additional benefits, such as, reducing the time to warm up the automatic transmission 140, which may improve the shift quality of the automatic transmission 140. The increased heat in the vehicle 110 may also lower accessory drive noises and wear, and help the torque converter 130 to aerate after long soaks. Moreover, the increased heat in the vehicle 110 may improve real world fuel economy and the vehicle's 110 alternator charging rate.

In some embodiments, the automatic transmission 140 may not stall the input shaft 210 every time the automatic transmission 140 is in park. For example, the automatic transmission 140 may only stall the input shaft 210 when the temperature of the oil in the engine 120, the automatic transmission fluid, or other fluids in the vehicle 110, engine 120, or automatic transmission 140 are below a threshold temperature. The threshold temperature may be 20 degrees Fahrenheit, 30 degrees Fahrenheit or some other temperature.

Further, in some embodiments, if the input shaft 210 is stalled, the automatic transmission 140 may disengage the friction elements 260 once the temperature of the engine 120 and/or the automatic transmission 140 is above a threshold temperature. In one embodiment, the threshold temperature may be 180 degrees Fahrenheit. In another embodiment, the threshold temperature may be 160 degrees Fahrenheit.

In some embodiments, the automatic transmission 140 may also alter the sequencing of gears ratios implemented by the automatic transmission 140 if an operator places the automatic transmission 140 in drive from park when the input shaft 210 is stalled. For example, in the example embodiment illustrated in FIG. 4, the automatic transmission 140 may engage the second, third, and fifth friction elements 262, 263, and 265 when in park to stall the input shaft 210. With the input shaft 210 stalled, the engine's 120 throttle may be opened so that the engine's 120 idle speed is equal to a first gear level. In this situation, if the operator of the vehicle 110 places the automatic transmission 140 in drive, the automatic transmission 140 may implement second gear instead of implementing first gear as would normally occur when the automatic transmission 140 is placed in drive. In some embodiments, the automatic transmission 140 may implement third gear instead of implementing first or second gear when the automatic transmission 140 is placed in drive if the engine idle speed reaches the appropriate level. In some circumstances, however, such as when the throttle is open more than 50 percent or the operator of the vehicle 110 selects manual low mode, the automatic transmission 140 may implement first gear instead of second or third gear.

Figure 4:
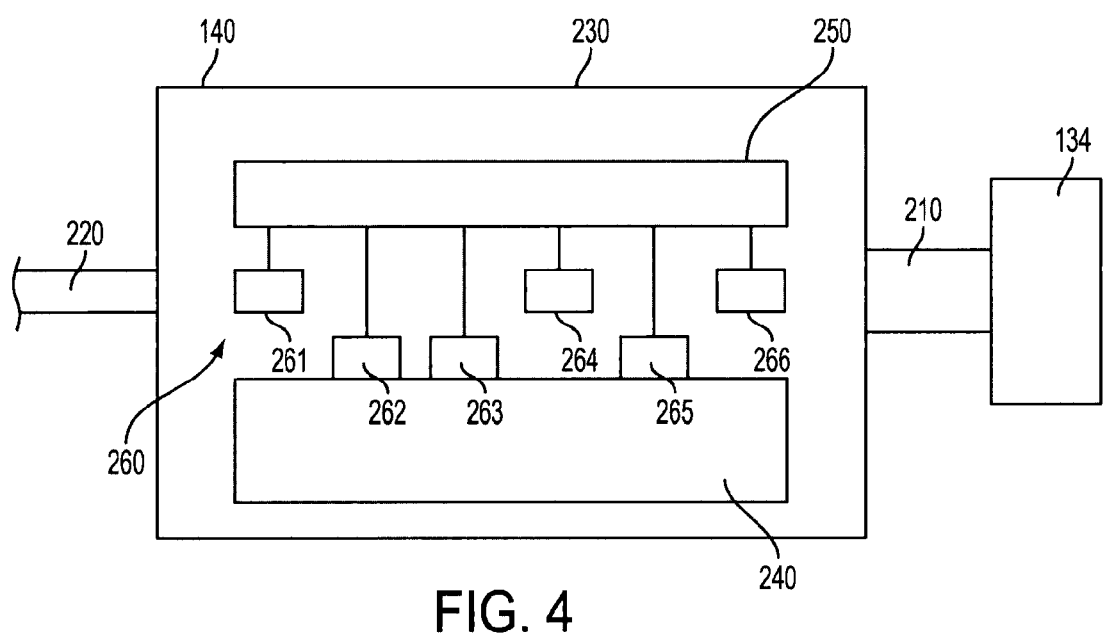
FIG. 4 illustrates the exemplary transmission of FIG. 2 with select friction elements engaged in accordance with a disclosed embodiment.
Figure 5:
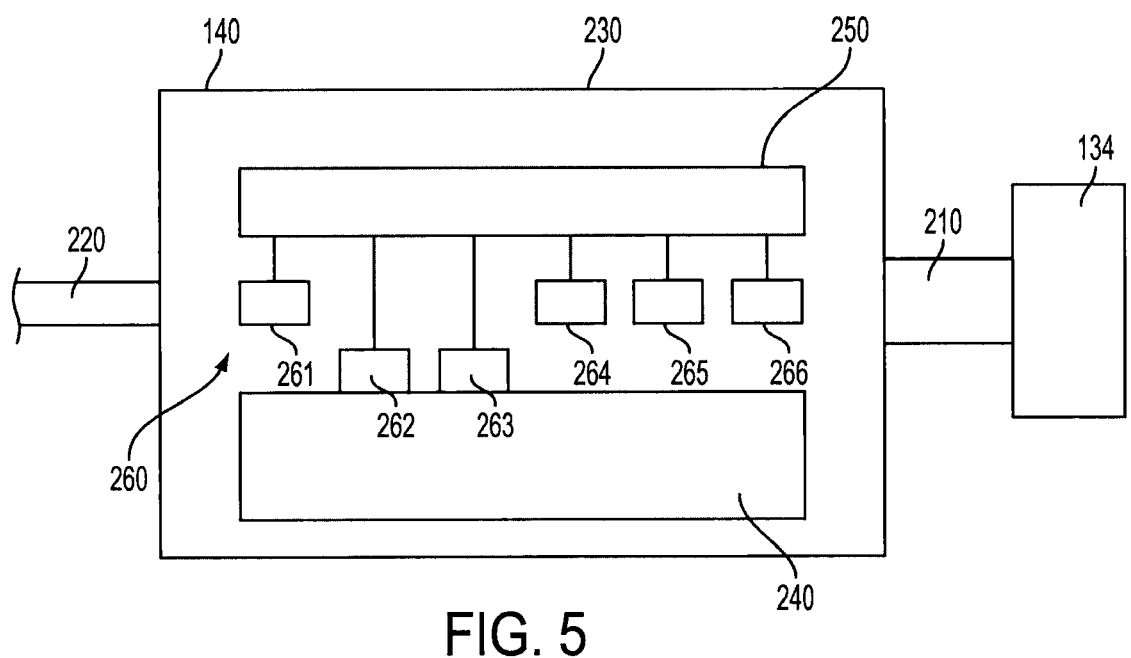
FIG. 5 illustrates the exemplary transmission of FIG. 2 with select friction elements engaged in accordance with a disclosed embodiment.

To reduce the time for the automatic transmission 140 to transition from stalling the input shaft 210 to implementing a gear, the automatic transmission 140 may simply engage the necessary friction elements 260 that are needed to implement the gear. For example, in one embodiment, the automatic transmission 140 may use the second and third friction elements 262, 263 to implement second gear, as is illustrated in FIG. 5. To reduce the transition time to implement second gear when the automatic transmission 140 is placed in drive from park, the automatic transmission 140 may initially engage the second, third, and fifth friction elements 262, 263, 265 to stall the input shaft 210 as illustrated in FIG. 4. Then, to transition to second gear from stalling the input shaft 210, the automatic transmission 140 only has to disengage the fifth friction element 265. By only having to disengage a single friction element, the transition time may be reduced and torque may be more quickly provided to the vehicle's 110 wheels from the engine 120.

What is claimed is:

1. A transmission for loading an engine in a vehicle, the transmission comprising:
   a gear set;
   an input shaft coupled to the gear set;
   a plurality of friction elements coupled to the gear set; and
   a control system to direct a subset of the plurality of friction elements to engage the gear set to stall the input shaft;
   wherein the plurality of friction elements comprises six friction elements, and the subset comprises any three of the plurality of friction elements; and
   wherein the control system disengages one of said any three friction elements to implement one of a second gear and a third gear directly after stalling the input shaft.

2. The transmission of claim 1, further comprising an output shaft coupled to the gear set, wherein no torque is transferred to the output shaft when the input shaft is stalled.

3. The transmission of claim 1, wherein the subset of the plurality of friction elements engage the gear set to stall the input shaft when the transmission is in park.

4. The transmission of claim 1, wherein the input shaft is coupled to the engine, and stalling the input shaft places a load on the engine.

5. The transmission of claim 1, wherein the control system directs the subset of friction elements to engage the gear set when a temperature of the engine is below a threshold.

6. A transmission for loading an engine in a vehicle, the transmission comprising:
   a gear set;
   an input shaft coupled to the gear set,
   a plurality of friction elements coupled to the gear set; and
   a control system to direct a subset of the plurality of friction elements to engage the gear set to stall the input shaft;
   wherein the control system directs the subset of friction elements to disengage the gear set when a temperature of the engine is above a threshold.

7. A method of loading an engine in a vehicle, said method comprising:
   providing a transmission comprising a gear set, an input shaft coupled to the gear set, and a plurality of friction elements coupled to the gear set;
   engaging the gear set with a subset of the plurality of friction elements to stall the input shaft and place a load on the engine;
   wherein the plurality of friction elements comprises six friction elements and said engaging step comprises engaging any three of the six friction elements; and
   disengaging one of said any three friction elements to implement one of a second gear and a third gear after stalling the input shaft.

8. The method of claim 7, wherein the transmission further comprises an output shaft coupled to the gear, and wherein said engaging step does not transfer torque to the output shaft.

9. A method of loading an engine in a vehicle, said method comprising:
   providing a transmission comprising a gear set, an input shaft coupled to the gear set, and a plurality of friction elements coupled to the gear set;
   engaging the gear set with a subset of the plurality of friction elements to stall the input shaft and place a load on the engine,
   wherein the plurality of friction elements comprises six friction elements and said engaging step comprises engaging any three of the six friction elements; and
   disengaging said any three friction elements when a temperature of the engine is above a threshold.

10. The method of claim 7, wherein said engaging step occurs when a temperature of the engine is less than a threshold.

11. The method of claim 7, wherein said engaging step occurs when the transmission is in park.

12. The method of claim 7, wherein the input shaft of the transmission is coupled to the engine so that said engaging step places the load on the engine.

13. The transmission of claim 1, wherein the control system disengages one of said any three friction elements to implement said second gear directly after stalling the input shaft.

14. The transmission of claim 1, wherein the control system disengages one of said any three friction elements to implement said third gear directly after stalling the input shaft.

15. The method of claim 7, wherein said second gear is implemented after stalling the input shaft.

16. The method of claim 7, wherein said third gear is implemented after stalling the input shaft.

* * * * *